United States Patent [19]  [11] 3,984,195
del Carpio  [45] Oct. 5, 1976

[54] CONTINUOUS PRODUCTION OF PLANAR EXPANDED POLYURETHANE BLOCKS

[75] Inventor: Bernardo del Carpio, Madrid, Spain

[73] Assignee: Planiblock, S.A., Madrid, Spain

[22] Filed: Oct. 11, 1974

[21] Appl. No.: 514,275

[30] Foreign Application Priority Data
Feb. 20, 1974 Spain .................................. 423434
Apr. 26, 1974 Spain .................................. 425714
May 27, 1974 Spain .................................. 426688

[52] U.S. Cl. ............................ 425/89; 264/463; 425/224; 425/290; 425/817 C
[51] Int. Cl.$^2$ ................................. B29D 27/04
[58] Field of Search ............... 264/51, 52, 54, 46.3, 264/154, 46.2; 425/4 C, 817 C, 290, 291, DIG. 119, 89, 224, 376, 115, 329

[56] References Cited
UNITED STATES PATENTS

| | | | |
|---|---|---|---|
| 3,152,361 | 10/1964 | Edwards | 425/817 C X |
| 3,178,768 | 4/1965 | Edberg | 425/4 C |
| 3,240,846 | 3/1966 | Voelker | 425/817 C X |
| 3,354,503 | 11/1967 | Joseph et al. | 425/224 |
| 3,383,449 | 5/1968 | Muller | 425/290 X |
| 3,471,906 | 10/1969 | Henry | 425/376 |
| 3,553,300 | 1/1971 | Buff | 425/4 C |
| 3,574,802 | 4/1971 | Hinds et al. | 264/46.3 |

FOREIGN PATENTS OR APPLICATIONS
620,180  5/1961  Canada ........................... 425/4 C Primary Examiner—Francis S. Husar
Assistant Examiner—Mark Rosenbaum
Attorney, Agent, or Firm—Eyre, Mann, Lucas & Just

[57] ABSTRACT

Apparatus for producing continuous polyurethane blocks is disclosed. The apparatus includes pressure regulating members to prevent a crowning of the upper surface of the foamed material. The pressure regulating members comprise a plurality of surface elements each of which is rigid and fixed with respect to an axis taken along the width of the foam. The plurality of elements is arranged or utilized so that the entire width of the foamed material is superposed. The surface elements may be in the form of shoes or rollers. The width of the foamed material may be adjusted by adjusting the apparatus side walls. In such a case, the plurality of surface elements will be arranged or utilized to superpose the entire width without the necessity of shutting down the process or manually adjusting the width of the elements. The shoes or rollers are pivoted or suspended from a common frame so that they are freely movable along the surface of the foamed material in the forward or reverse direction of foam movement. The apparatus further comprises means for enclosing the foam in a separating material, means for heating the foam surface, means for joining the material to the upper surface of the foam, and means for perforating the separating material lying on the upper surface of the foam.

33 Claims, 19 Drawing Figures

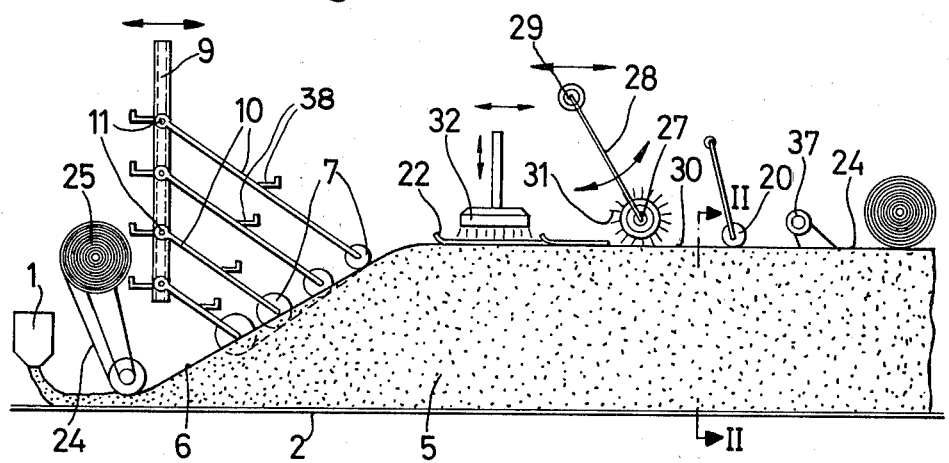
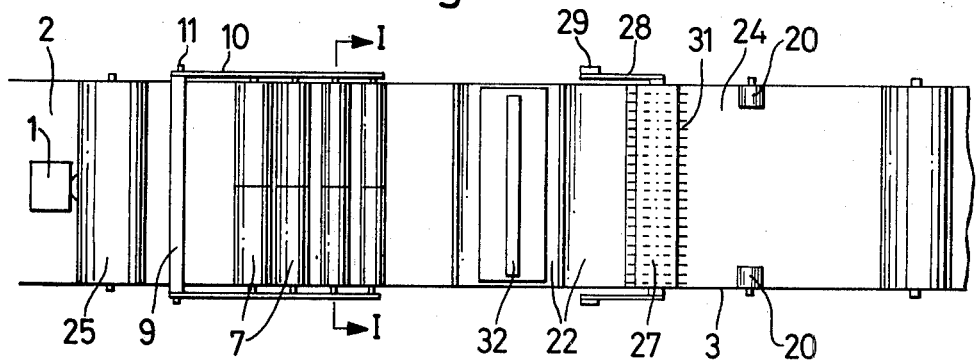

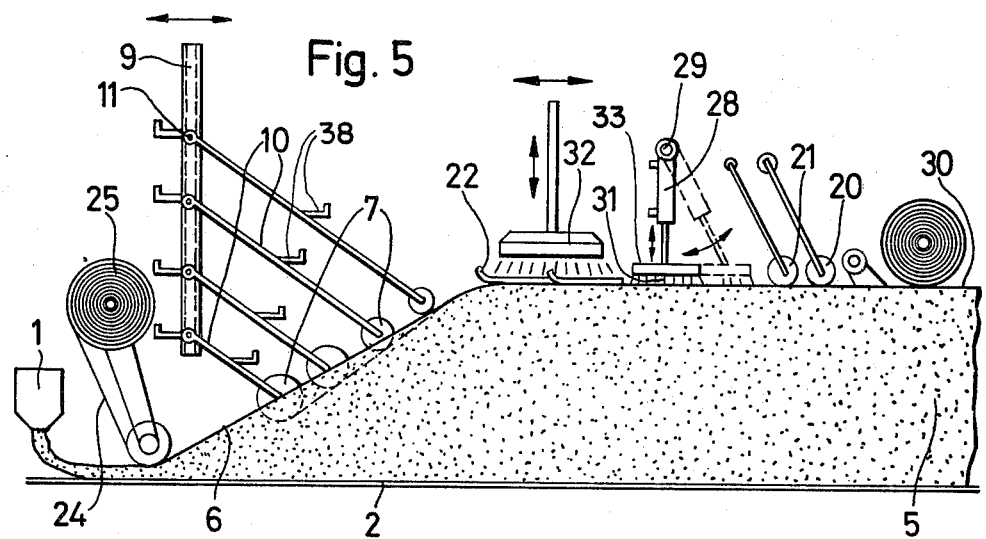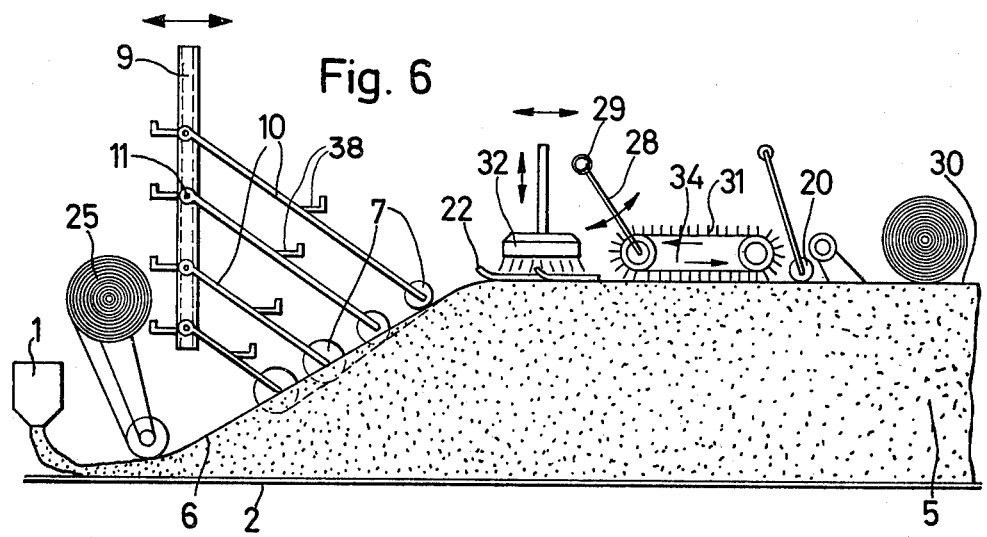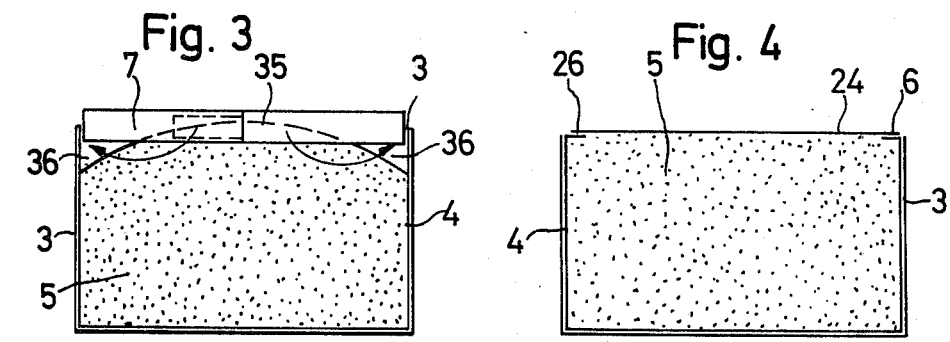

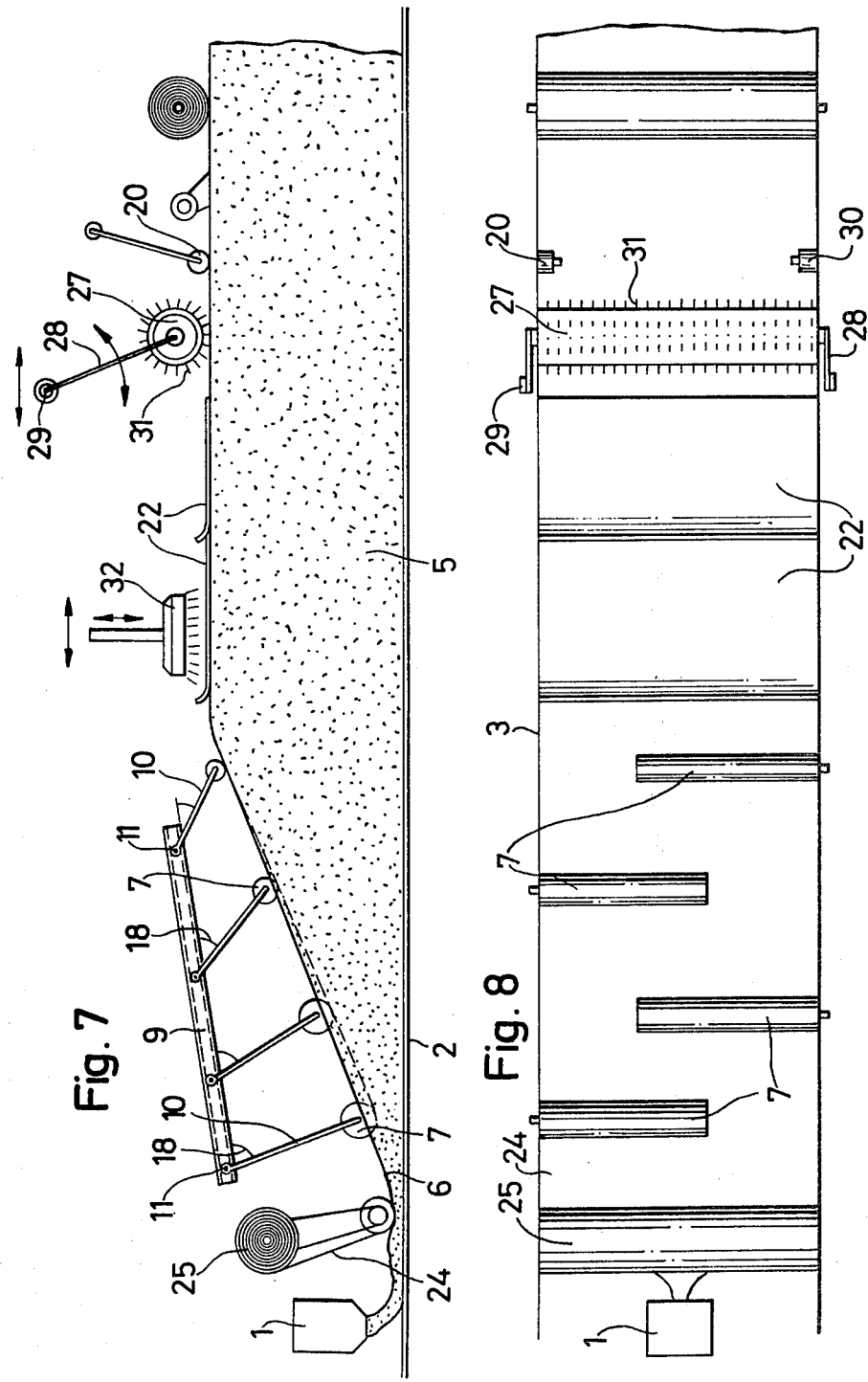

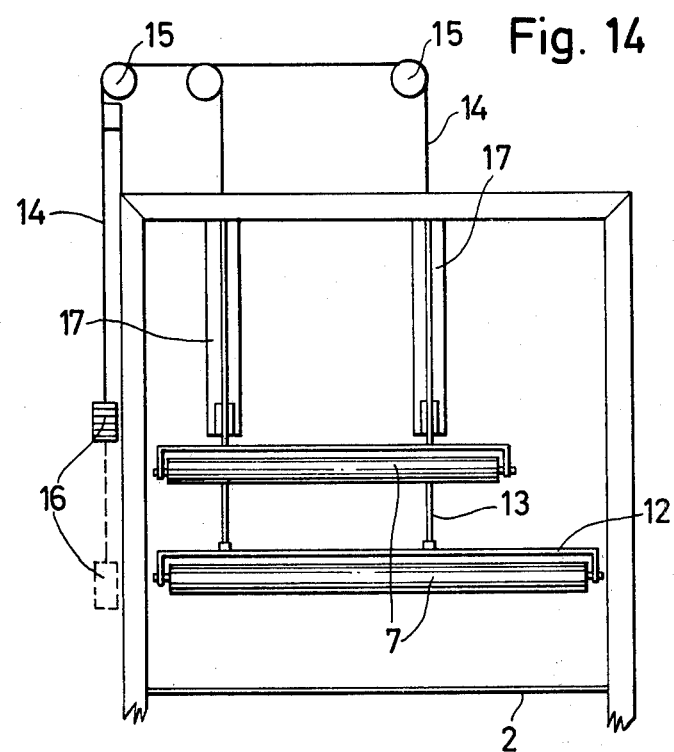
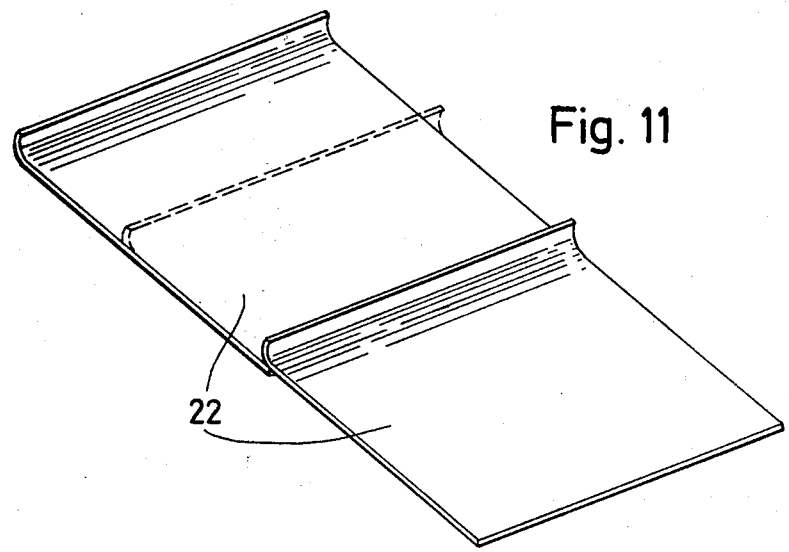

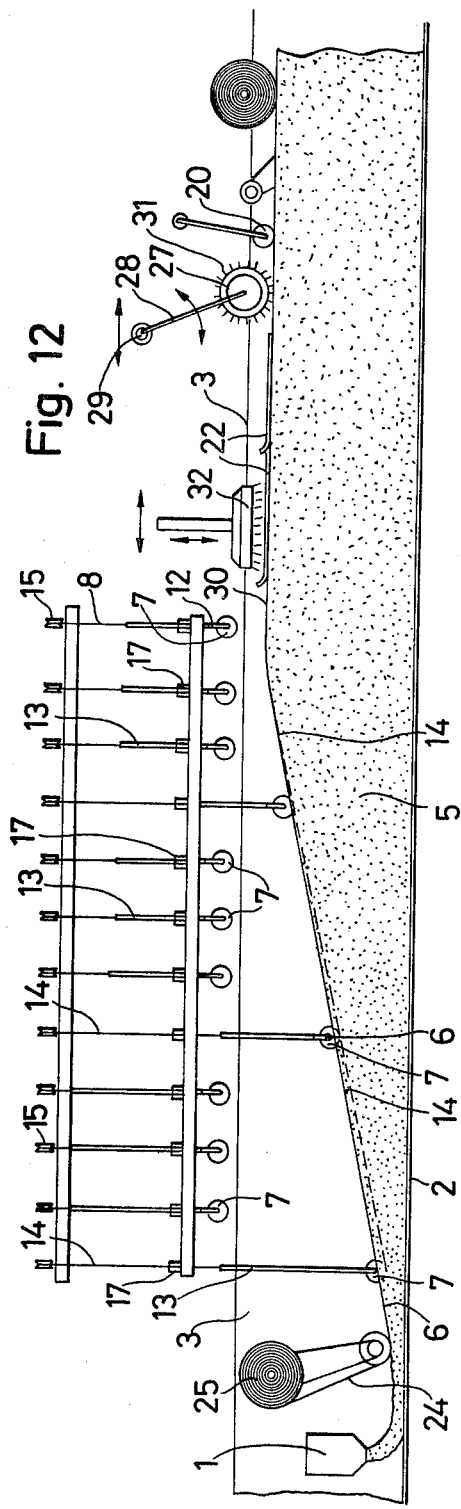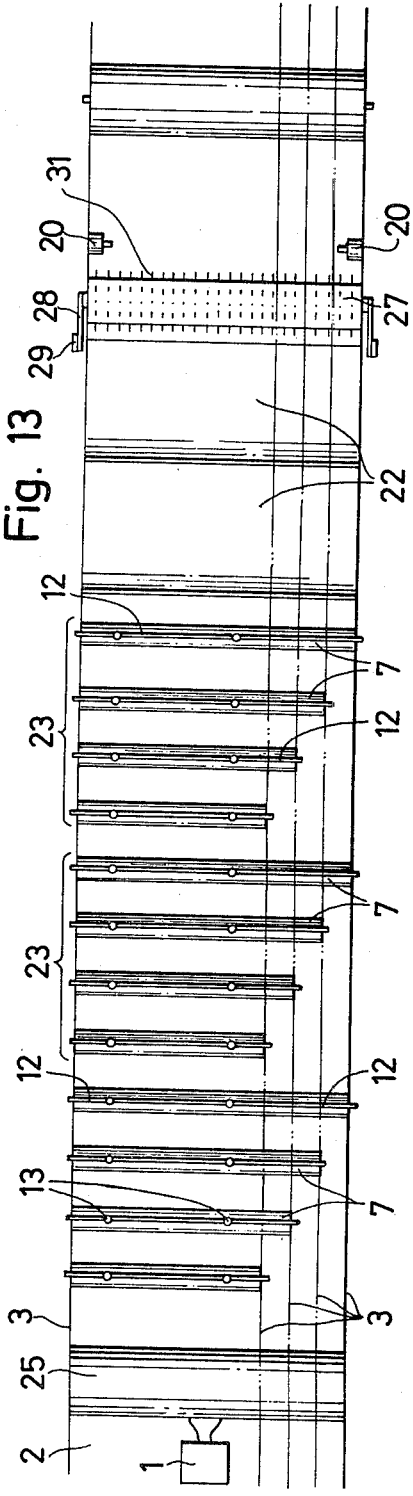

CONTINUOUS PRODUCTION OF PLANAR EXPANDED POLYURETHANE BLOCKS

The present invention relates to a new system for obtaining in an industrial polyaddition process a continuous expanded cellular polyurethane block of rectangular cross-section whose upper surface is planar, smooth and free from hardness and has uniform density and permeability.

Research has been carried out for some considerable time in the expanded polyurethane industry with the object of solving its greatest problem, the formation of a convex upper surface, i.e., in the form of a dome once the continuous block has been obtained. This dome-shaped surface is produced by the "crowning effect" due mainly to the friction between the expanding foam and the side walls of the mould and in addition during the expansion of the foam and exothermal reaction occurs so that there is more heat in the central areas where expansion is greater. The fundamental problem existing in the manufacture of continuous expanded polyurethane blocks is the formation of the said dome i.e., the greater expansion in the central area than in the sides of the block.

Another disadvantage which occurs is the production of hard irregular upper surfaces.

The defect produced by the crowning effect leads to a loss of material, a loss of subsequent finishing time and naturally increases costs so that a great deal of research is being devoted at providing a method or system which obviates this problem. Hitherto numerous attempts have been made to solve this problem but none have been able to completely eliminate it and up to now no block with a completely rectangular cross-seciton has been produced.

Furthermore, the systems used hitherto have another significant problem which is that when the band width has to be regulated, i.e., when blocks of a greater or lesser width are required which is carried out by varying the distance separating the side walls of the mould and the different connections which exist, it is necessary to vary the width of the pressure devices used by each system which must be carried out at the same time so that there is a period during which it is impossible to regulate the expansion of the foam so that there is a loss of time and material when the blocks surface is not horizontal.

Numerous systems have been provided such as that using a continuous regulating member or that using pairs of rollers, etc., which lead to improvements in the formation of the block but do not bring about a completely planar block having the upper surface parallel to the lower surface as well as providing a perfect finish.

These methods do not have the elasticity and at the same time the rigidity necessary relative to the regulating members for the foam rise. They also have the problem of being interdependent, that is to say that they must all be operated at the same time and form an assembly.

By means of the system recommended by the invention, a continuous expanded cellular polyurethane block of completely rectangular cross-section is obtained, that is to say a block with a planar upper surface parallel to the lower surface whch obviates the crowing effect whilst at the same time ensuring that the said surface is permeable, free from hardness, without roughness and having uniform density whilst having the following advantages:

1. Fundamentally, prevents the formation of the crowning effect rather than attacking it once formed.
2. As it comprises discontinous regulating members which are independent of one another, it is possible to gradually regulate the pressure as the plasticity or viscosity of the polymer increases during its growth.
3. Possibility of applying pressure over the complete width of the foaming liquid even with width variation as from the start of creaming.
4. As the members are independent, it is possible to treat the foaming surface at any time in accordance with the state and characteristics thereof.
5. For the same reason, there is at all times great accesibility relative to the covering members whereby the foam surface can be seen directly in each creaming zone.
6. Perfect parallelism is obtained between the faces of the block due to the fact that the regulating members always pivot parallel to the base when they have rigid ends so that they must move at the same time and in the same direction.
7. With the arrangement of the regulating members (rollers or runners) the crowning effect is avoided through preventing the formation of side walls which are lower than the central area of the dome which would form it being compressed to fill the said depressions leading at the same time to homogeneous densities.
8. A single covering member is used which can be of conventional, i.e., porous type which reduces costs and prevents foaming gases from escaping before time so that there is no unnecessary consumption of such gases and protecting operators against them, whereby they are allowed to escape when no longer necessary.
9. The width of the block can be varied at any time without any need to stop the process.
10. It is always possible to ensure complete synchronization and adhesion between the foam and separating material which prevents the formation of pockets and therefore defects in the foam surface.

All the advantages mentioned hereinbefore are obtained through using over the complete creaming area of several independent pressure members arranged transversely to the block being disposed so as to float and rotate about the axis thereof and avoiding friction having absolute transverse rigidity relative to the block as well as longitudinal elasticity. These members for regulating rising can be flat or cylindrical pressure rollers, whereby the former can be substituted by pairs of rollers.

The pressure members for regulating the rise of the foam can be connected so as to swing around a fixed point in a frame which can have an appropriate slope relative to the foam surface, leading to different operating angles for the rollers and therefore to a gradual pressure regulation as the foam rises. They can also float vertically over the foam, whereby in this case the pressure exerted by each of them can be regulated by means of counterweights.

As has been stated hereinbefore, there is only one separating or covering material between the foam and the pressure regulators and this fulfills the following functions:

a. Eliminates oxidation of the upper surface of the foam.

b. Prevents foam when in the pasty state from contaminating the roller or plates with the resulting disadvantages.

c. Fully utilizes the foaming gases preventing them from escaping before time and therefore making it unnecessary to use a larger quantity of primary material bringing about considerable savings.

This material must not be porous and can be a conventional paper or the like which prevents the foaming gases from escaping to the outside so that they are utilized to the maximum. As it is not porous, it is possible to use a transparent material through which it is possible to see the surface of the foam at any time.

From the creaming or expansion area, pressure and heat are applied to the covering material in order to assist it in adhering to the foam thus avoiding the formation of pockets and assisting the synchronized loading of both bodies, this being achieved by means of floating plates and heat emitters.

In order to permit the escape of gas pockets produced in the foam at a suitable place after expansion, is arranged a perforating system for the said material employing for example needles or some similar pricking member.

The separating material and foam must have a totally synchronized movement with the object of avoiding the production of cracks and deformation. This is achieved by means of conventional mechanical methods which have regulating problems and involve the installation of costly equipment and also by connecting a device which initially causes the sides of the covering to adhere to the lining of the side walls and fundamentally involves the incorporation of a heat emitter which brings about the adhesion of the covering material and the foam to the desired extent regulating its position both longitudinally and heightwise relative to the block as well as its calorific intensity in order to permit their installation at the exact point dependent on the type of foam.

On connecting up the independent rollers separated from one another by an appropriate distance during the expansion of the foam it is ensured that the pressure of the rollers and the transverse rigidity thereof force the lateral distribution of the foam and prevent the formation of a dome, i.e., the crowning effect, thereby obtaining a block having a planar surface and a completely rectangular cross-section.

In summarizing, the new system is based on the following points:

a. The incorporation of pressure regulating members such as cylindrical rollers or runners which float, swing and which are independent of one another, gradually exerting the appropriate pressure on the forming foam depending on whether it increases its plasticity or viscosity, whereby it is possible to act at any time or state of the foam in an apppropriate manner over the complete width of the block, thus avoiding the formation of the crowning effect by distributing the material as from the central wall of the dome right up to the side walls.

b. The use of a separating material between the said rollers and the foam in order to avoid oxidation of the outer foam layer avoiding contamination by the foam of the rollers and ensuring that the foaming gases are utilized to the maximum and preventing them escaping and injuring operators.

c. It has a system for perforating the separating material to enable the gases produced to escape once they have been used to the full.

d. It has a series of devices for heating the separating material and resulting in it adhering to the foam, for separating the same, for obtaining a better finish and finally to be able to obtain the widthwise opening of the assembly without stopping the process.

To provide a better understanding of the invention, the attached drawings show in schematic manner its use, whilst these are not limitative and can be varied in any way which does not change the essential characteristics.

FIG. 1 shows a side view of the assembly with the incorporated system of pressure rollers and other members.

FIG. 2 is a plan view corresponding to FIG. 1.

FIG. 3 shows a cross-section along the line I—I showing the block being formed and the way in which the pressure device acts.

FIG. 4 is a cross-section along the line II—II which shows the final finish of the completely rectangular block.

FIG. 5 is a side view of the system used for perforating a plate.

FIG. 6 shows the same view as FIG. 5 with an endless belt or conveyor as the perforating member.

FIG. 7 is a side view of the assembly in a different embodiment.

FIG. 8 shows a plan view of FIG. 7.

FIG. 11 is a perspective view of the floating pressure plates.

FIG. 12 is a side view of another embodiment of the system using groups of rollers having different widths.

FIG. 13 is a corresponding plan to that of FIG. 12.

FIG. 14 is a side view of the embodiment of FIG. 12.

In the drawings the following details are shown:

Figure 10:
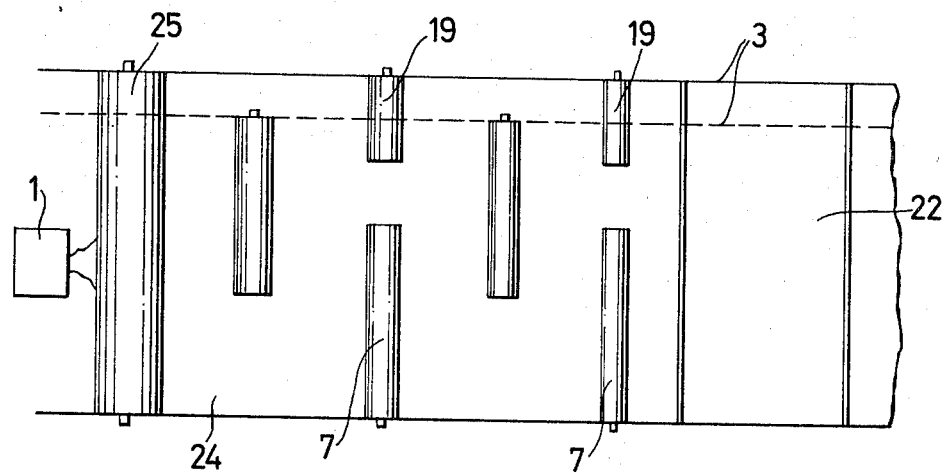
FIG. 10 shows a plan view of the assembly whereby the width has been filled with the initial fixed rollers and the auxiliary rollers which complete the width.

1. Discharge regulator.
2. Moving base.
3. Side walls.
4. Inner mould or lining.
5. Foam.
6. Zone where expansion starts.
7. Regulating rollers.
8. Pressure plates or runners.
9. Supporting device.
10. Floating frames.
11. Swinging or tilting centres.
12. Supporting frame.
13. Rigid bars
14. Cable.
15. Pulleys.
16. Counterweights.
17. Guidance members.
18. Angles.
19. Secondary rollers or runners.
20. Auxiliary rollers.
21. Pressure roller.

22. Pressure plates.
23. Groups of rollers or runners.
24. Separating or covering material.
25. Separating material supply.
26. Adhesive or adhesive tape.
27. Perforating roller.
28. Fixing member.
29. Pivoting spindle.
30. Upper horizontal area.
31. Pricking members.
32. Heat emitter.
33. Perforating plate.
34. Perforating belt or conveyor.
35. Member.
36. Grooves.
37. Joining device.
38. Weights.

The recommended system comprises a first foaming liquid discharge phase by means of discharge regulator 1, whereby the material falls onto the moving base 2 which transports it and expansion starts in area 6.

Between base 2, side walls 3 and foam 5 is provided lining 4, which moves at the same time as base 2 of the mould, thereby transporting foam 5 and preventing it from sticking and contaminating the mould and at the same time eliminating as far as possible any friction.

The system recommends the installation in expansion zone 6 of rollers 7 or runners 8 located transversely relative to block 5 and which idle around the spindle being fixed in floating manner by means of frames 10 with a possibility of swinging or tilting about points 11 where supporting device 9 is connected. Supporting device 9 is regulatable in its longitudinal position relative to block 5 as is shown by the arrows so it is possible to regulate the position of rollers 7 depending on the requirements of the type of foam to be produced.

As a result of these rollers 7 or runners 8 and their couplings, it is possible to obtain longitudinal flexibility relative to block 5 because they are floating and transversely rigid and as a result during its expansion the foam does not rise more in the central portion than at the sides.

Rollers 7 or runners 8 prevent the formation of the crowning effect because as can be seen in FIG. 3 on exerting pressure over the forming foam 5 the material in the central area is distributed towards the lateral grooves filling the latter and therefore obtaining the upper horizontal zone 30. Weights 38 may be employed (FIGS. 1 and 5–6) to assist in maintaining pressure on the foamed material.

The invention recommends numerous variants of the system which will be described hereinafter.

Thus, rollers 7 or runners 8 can be telescopic, thus at any time they can vary their longitudinal dimensions adapting to the width of block 5 and in view of the interdependence between them, it is obvious that when it is necessary to produce a wider block as covering material 24 advances, it is possible to start utilizing rollers 7 or runners 8 so that from the outset a start is made with the production of a block 5 having the desired characteristics and dimensions without loss of material.

Figure 18:
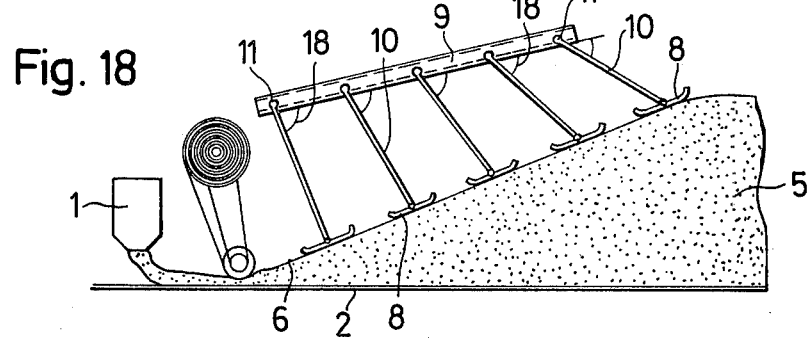
FIG. 18 is another embodiment of the system of swinging rollers.
Figure 19:
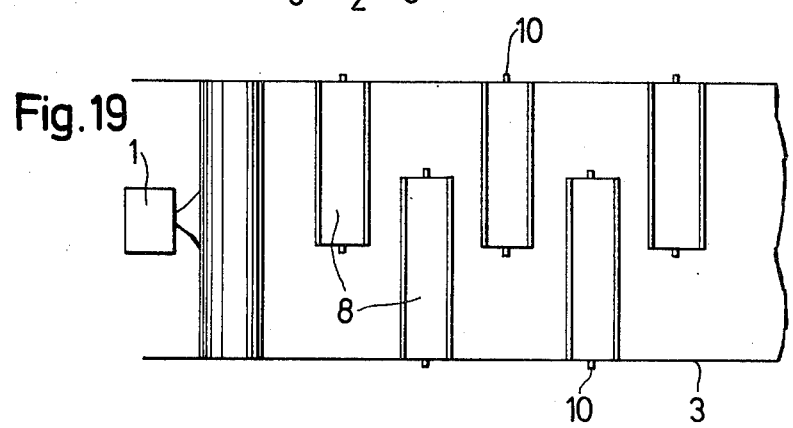
FIG. 19 shows the plan view of FIG. 18.

According to another embodiment, the cylindrical rollers 7 or runners 8 which float by means of frames 10 are fixed by means of the swinging or tilting centres 11 to the supporting device 9 which in this case is arranged in an inclined manner as can be seen in FIGS. 7 and 18 so that the angles 18 formed between the said device 9 and the frames 10 decrease as the foam 5 rises, so that a greater pressure is obtained in the upper area so that in this way the pressure exerted is regulated at all times and states of the rise of foam 5.

Figure 9:
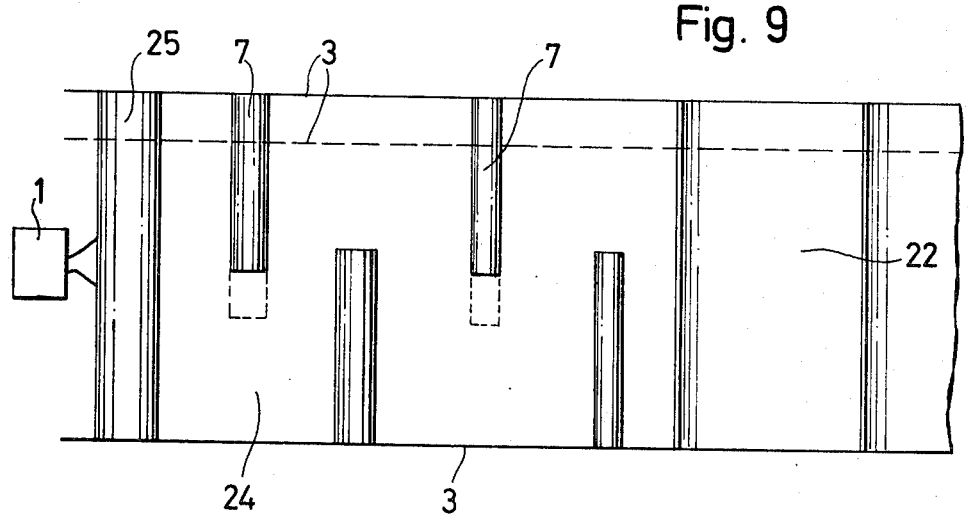
FIG. 9 is a plan view of the assembly with the width filled and with the rollers on one side moved.
Figure 15:
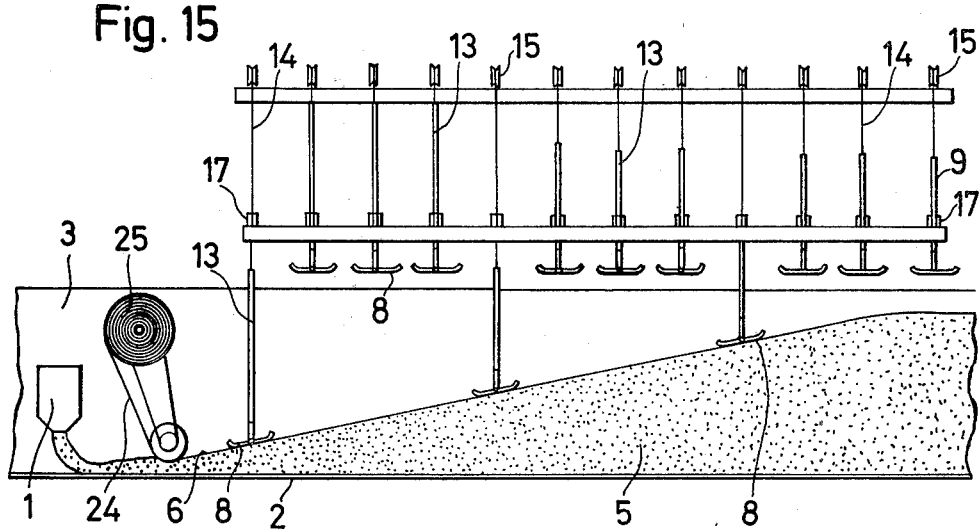
FIG. 15 is an identical view to that of FIG. 12 in an embodiment where the rollers are replaced by runners.

In this embodiment, both the cylindrical rollers 7 and the runners 8 are arranged alternately without them however covering the complete width of the block as can be seen in FIGS., 8, 9, 10, 19. The idea behind this arrangement is that on varying the separation of the side walls 3, as shown in FIG. 9, only those of one wall are laterally moved whilst the others remain fixed, whereby it is possible to vary the width of block 5 within a progressive manner without stopping the process.

The width variation can also be obtained with the embodiment of FIG. 10 wherein secondary rollers or runners 19 are connected between the main rollers 7 and 9 in such a way that on varying the width of the block, rollers 7 or runners 8 remain fixed taking down the secondary rollers 19 which complete the desired width.

Figure 16:
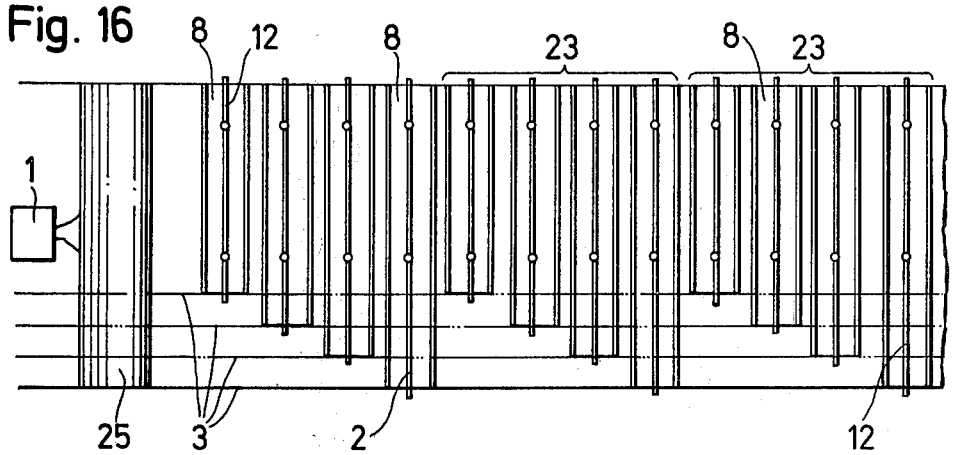
FIG. 16 is a plan corresponding to FIG. 15.
Figure 17:
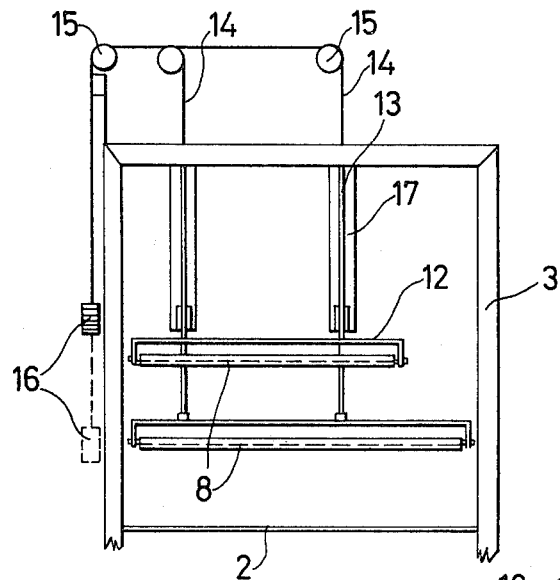
FIG. 17 is a side view of FIG. 15.

In another embodiment of the system, rollers 7 or runners 8 remain independent on one another but are combined into groups 23 as can be seen in FIGS. 13 and 16, whereby each of these groups 23 has identical series of rollers 7 or runners 8 of different lengths so that at any time the system can operate with the pressure member of desired and appropriate width.

The rollers 7 or runners 8 of each group 23 continue to float by means of frame 12 supported by bars 13 which are in turn joined to cables 14 passing via pulleys 15 and terminating in counterweights 16. The complete system has guidance members 17 for the different devices.

By means of this arrangement, when the foam 5 starts to rise in area 6, rollers 7 or runners 8 drop by the desired width, whereby this involves one from each group 23 and in this way the pressure exerted by each of these is regulated by the counterweights 16. When there is a width variation the acting rollers 7 or runners 8 slowly rise at the speed of foam 5 and those of appropriate widths drop in similar manner.

As rollers 7 or runners 8 cannot reach the side walls 3, there is a small longitudinal border in block 5 where there is no horizontal alignment. The system recommends the arrangement of auxiliary rollers 20 which in the lateral areas of block 5 exert the pressure necessary for correcting this fault.

The separating or covering material 24 is placed between the pressure members and foam 5 in order to prevent foam 5 from oxidizing, contaminating rollers 7 or runners 8 and retains the foaming gases to the maximum. This material 24 which must not be porous because it must serve to retain the foaming gases can be opaque or transparent making it possible to visually follow the foam surface and rapidly detect any possible defects.

The movement of covering material 24 must be synchronized with that of foam 5 in order to avoid friction and tension which could lead to cracks in the surface of foam 5. Therefore, in one embodiment a joining device 37 is provided for joining the material 24 is lining 4 of side walls 3 by means of adhesive 26. The heat emitter 32 is also incorporated to produce to a greater or lesser extent the join between material 24 and the surface of foam 5 thus bringing about the total synchronization of the movement of both. Heat emitter 32 has a possibility of being longitudinally and heightwise regulatable relative to block 5 and is also regulatable in intensity so that covering material 24 adheres to a greater or lesser extent to foam 5.

Furthermore, following the culmination of area 6 and already in horizontal area 30 are provided pressure plates 22 which assist adhesion between foam 5 and material 24 and at the same time the latter is loosened on being free. These plates 22 are telescopic as shown in FIG. 11 with the object of acting over the complete surface. Plates 22 are also heated by heat emitter 32 and transmit this heat to material 24 which assists its joining to the foam.

As the separating material 24 is not porous the foaming gases are retained and thereby utilized to the maximum but to permit them to escape when they are no longer needed, the system provides for the incorporation of a perforating or pricking device for the said material 24 by means of which the said gases can escape.

This perforation system comprises a device fitted with a means which can perforate material 24 using for example needles or any other appropriate members 31.

These perforating means 31 are fixed by means of member 28 which through being joined to pivoting shaft 29 has a certain elasticity of movement and produce a constant pressure appropriate for the weight of the said assembly and which can be coupled over the surface of foam 5 via separating material 24.

Various embodiments of the perforating means are possible such as roller 27, plate 33 or conveyor 34. In the case of plate 33 due to the fact that it does not exert a very great pressure, roller 21 is connected in order to produce the necessary pressure.

Once foam 5 in the liquid state starts to be discharged from discharge regulator 1, the moving base 2 transports it by means of lining 4 which occupies the said base 2 and walls 3. Immediately it comes into contact with the air, foam 5 starts to expand in area 6 and as it tends to expand more in the center than at the sides due to the crowning effect, this is resisted by the transverse rigidity of rollers 7 or runners 8 which distribute the material towards the sides and fill grooves 36 as shown in FIG. 3.

At the same time as foam 5 starts to expand in area 6, device 25 distributes the material 24, whereby when the foam passes over rollers 7 or runners 8 it becomes located between the same and advances synchronously aided by device 37 and heat emitter 32 which causes foam 5 to adhere to material 24 to a greater or a lesser extent depending on the position regulation performed thereon.

If at any time it is desired to obtain a block 5 of greater width, walls 3 by means of which the mould varies its dimensions are moved apart whilst at the same time supplying covering material 24 of greater width and as this passes via rollers 7 or runners 8 the latter slowly open due to the telescopic system and independence between the same (first embodiment) or those of one wall are moved away or those of appropriate width in each group 23 are lowered, etc.

The independence existing between each of the rollers 7 or runners 8 of the recommended system is the fundamental advantage thereof making it possible to regulate the rise of foam 5 in discontinuous manner, treating it at any time and section of rise thereof in an appropriate manner for its state and the requirements of the foam in question.

What we claim is:
1. In an apparatus for a continuous foam expansion process:
   a. a discharge stage having a base and side walls for receiving an expandable liquid material, said base and side walls extending beyond said discharge stage;
   b. surface pressure regulating means to prevent a crowning effect of the upper surface of the resulting foamed material positioned in the zone where the liquid material is adapted to commence expanding, said surface means comprising
      i. a plurality of surface elements each of which is rigid and fixed with respect to an axis taken along the transverse surface of the foamed material, said plurality of elements being operatively utilized to superpose the entire transverse dimension of the foamed material,
      ii. a common frame for supporting each said element, and
      iii. securing means for pivotably securing each said element to said frame, said securing means being operatively secured to said frame and said elements so that each said element is movable along substantially the upper surface of the foamed material in the longitudinal directions of foam movement; and
   c. a separating material positioned between the foamed material and the surface means.

2. Apparatus according to claim 1, wherein said common frame is adjustably movable in longitudinal directions of foam movement.

3. Apparatus according to claim 1, wherein said common frame and said securing means are operative to support each said element independently.

4. Apparatus according to claim 3, wherein said elements are not directly interconnected and non-continuously superpose the foamed material along its longitudinal dimension.

5. Apparatus according to claim 4, wherein said discharge stage is transversely adjustable with respect to the longitudinal directions of foam movement and said plurality of surface elements are operatively utilized to superpose the entire transverse dimension of the foamed material over the transverse adjustable range of said discharge stage.

6. Apparatus according to claim 5, wherein said securing means comprises pivot means and frame means, said elements being connected to said frame means and said frame means being pivotally connected to said common frame.

7. Apparatus according to claim 6, wherein said pivot means is operative when pivoted to permit movement of said surface elements substantially parallel to the surface of the foamed material.

8. Apparatus according to claim 7, wherein said pivot means are positioned along a common axis on said common frame.

9. Apparatus according to claim 6, wherein said surface means further comprises weight means associated with said frame means to assist in maintaining contact between the surface elements and the foamed material.

10. Apparatus according to claim 5, wherein said securing means comprises frame means, guide means, pulley means, cable means and weight means, said surface elements being connected to said frame means at one end thereof, said cable means being connected to said frame means at the other end thereof, said guide means being mounted on said common frame and operative to guide said frame means for movement therethrough, said pulley means being mounted on said common frame and being operative to engage said cable means, said cable means terminating in said weight means, said securing means being operative to selectively engage any of said surface elements with the foamed material.

11. Apparatus according to claim 6, wherein the length of each said surface element is insufficient to superpose the entire transverse dimension of the foamed material over at least a portion of said transverse adjustable range, the entire transverse dimension over said portion being superposed by a plurality of staggered surface elements.

12. Apparatus according to claim 9, wherein said plurality of surface elements comprises at least one group of surface elements of differring lengths and wherein said securing means is operative to position at least one surface element from each of said at least one group in contact with said foamed material.

13. Apparatus according to claim 6, wherein the length of each of said surface elements is sufficient to superpose the entire transverse dimension of the foamed material when said discharge stage is in a corresponding one of its adjusted positions.

14. Apparatus according to claim 6, wherein said surface means further comprises a plurality of secondary surface elements positioned to superpose a minor portion of the foam material adjacent said discharge stage side walls.

15. Apparatus according to claim 1, which further comprises heating means for joining said separating material to the foamed material.

16. Apparatus according to claim 15, wherein said heating means comprises a heat source, means to regulate the positioning of the heat source relative to the foamed material, and means to regulate the intensity of the heat source.

17. Apparatus according to claim 1, which further comprises means for perforating said covering material after it has been joined to the foamed material.

18. Apparatus according to claim 17, wherein said perforating means comprises a pivoting plate having pricking members thereon.

19. Apparatus according to claim 17, wherein said perforating means comprises a roller having pricking members thereon and means to rotatably mount said roller operative to rotate freely and contact said covering material.

20. Apparatus according to claim 17, wherein said perforating means comprises a conveyor belt having pricking members thereon.

21. Apparatus according to claim 15, further comprising a plurality of slidably mounted plates operative to contact and slide on said covering material and positioned approximately below said heating means, said plates being further operatively mounted to overlap at least during a portion of the time they are slid on said covering material.

22. Apparatus according to claim 1, which further comprises liner means for lining the base and side walls of said discharge stage and means for moving said liner means and said covering material in sychronization with the foamed material.

23. Apparatus according to claim 22, which further comprises joining means for joining said liner means and said covering material to enclose the foamed material.

24. Apparatus according to claim 23, wherein said joining means comprises an adhesive.

25. Apparatus according to claim 1, which further comprises finishing means for finishing corners of the foamed material, said finishing means comprising a plurality of pivoted auxiliary rollers positioned adjacent said side walls.

26. Apparatus according to claim 1, wherein said surface elements are cylindrical in shape and rotatably connected to said securing means.

27. Apparatus according to claim 1, wherein said surface elements are in the form of plates having a smooth surface for contacting the surface of the foam material and are pivotably connected to said securing means.

28. Apparatus according to claim 1, wherein said covering layer is non-porous.

29. Apparatus according to claim 22, wherein said liner means is porous.

30. In an apparatus for a continuous foam expansion process:
   a. a discharge stage having a base and side walls for receiving an expandable liquid material, said discharge stage being transversely adjustable with respect to the longitudinal direction of foam movement, said base and side walls extending beyond said discharge stage;
   b. surface pressure regulating means to prevent a crowning effect of the upper surface of the resulting foamed material positioned in the zone where the liquid material is adapted to commence expanding, said surface means comprising
      i. a plurality of surface elements each of which is rigid and fixed with respect to an axis taken along the transverse surface of the foamed material,
      ii. said plurality of surface elements being pivotably operatively utilized to superpose the entire transverse dimension of the foamed material over the transverse adjustable range of said discharge stage; and
   c. a separating material positioned between the foamed material and the surface means.

31. Apparatus according to claim 30, in which said surface means further comprises a common frame for supporting each said element.

32. Apparatus according to claim 31, in which said surface means further comprises securing means for securing each said element to said frame, said securing means being operatively secured to said frame and said elements so that each said element is movable along substantially the upper surface of the foamed material in the longitudinal directions of foam movement.

33. Apparatus according to claim 32, wherein said common frame is adjustably movable in the longitudinal directions of foam movement.

* * * * *